United States Patent [19]

Nakata et al.

[11] Patent Number: 4,486,467

[45] Date of Patent: Dec. 4, 1984

[54] PROCESS FOR PRODUCING COBALT-CONTAINING MAGNETIC IRON OXIDE POWDER

[75] Inventors: Kazuo Nakata, Moriyama; Tsuneo Ishikawa, Kawanishi; Ichiro Honma; Arata Koyama, both of Moriyama; Masaharu Hirai, Shiga; Masatoshi Amano, Moriyama, all of Japan

[73] Assignee: Ishihara Sangyo Kaisha, Ltd., Osaka, Japan

[21] Appl. No.: 449,692

[22] Filed: Dec. 14, 1982

[30] Foreign Application Priority Data

Dec. 25, 1981 [JP] Japan .................................. 56-211477
Aug. 27, 1982 [JP] Japan .................................. 57-148965
Aug. 27, 1982 [JP] Japan .................................. 57-148966

[51] Int. Cl.$^3$ ............................................. C01G 49/02
[52] U.S. Cl. ................................ 427/129; 252/62.56; 427/127; 427/130
[58] Field of Search .................................... 252/62.56; 427/127–130

[56] References Cited

U.S. PATENT DOCUMENTS

| | | | |
|---|---|---|---|
| 4,064,292 | 12/1977 | Schoenafinger et al. | 427/128 X |
| 4,212,903 | 7/1980 | Schnell et al. | 428/900 X |
| 4,287,233 | 9/1981 | Rudolf et al. | 252/62.56 X |
| 4,379,183 | 4/1983 | Araki et al. | 427/128 X |
| 4,414,245 | 11/1983 | Miyazawa et al. | 252/62.56 X |

FOREIGN PATENT DOCUMENTS 150191 8/1981 Fed. Rep. of Germany ... 252/62.56

*Primary Examiner*—Jack Cooper
*Attorney, Agent, or Firm*—Cushman, Darby & Cushman

[57] ABSTRACT

A phosphorus-containing magnetic iron oxide powder is subjected to the activation with an aqueous alkaline medium under pressure and then coated with a cobalt compound or a cobalt compound and other metallic compound(s) to produce a cobalt-containing magnetic iron oxide powder. The magnetic iron oxide powder obtained according to this process finds its best application to the production of magnetic recording media.

17 Claims, 2 Drawing Figures

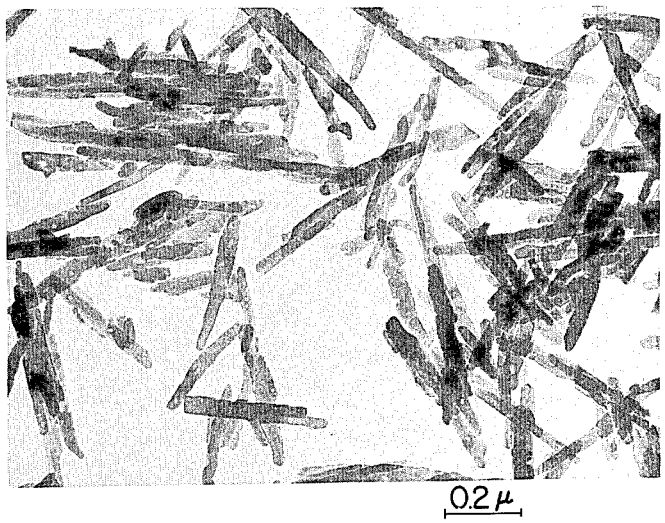
F I G. 1
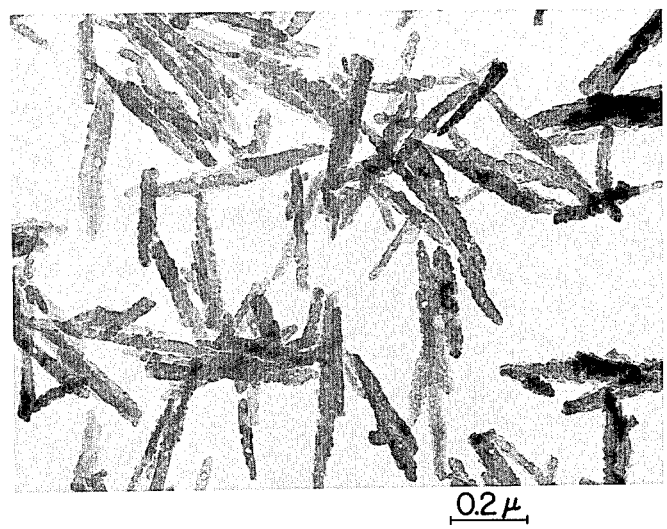
F I G. 2

PROCESS FOR PRODUCING COBALT-CONTAINING MAGNETIC IRON OXIDE POWDER

BACKGROUND OF THE INVENTION

This invention relates to a process for producing a cobalt-containing magnetic iron oxide powder which is useful as a magnetic material for magnetic recording media.

Generally, a cobalt-containing magnetic iron oxide powder has high coercive force and magnetic tapes produced therefrom are most suited for high density recording and also have excellent sensibility in the high frequency range. For these reasons, such cobalt-containing magnetic iron oxide powder is popularly used in the field of magnetic recording media such as acoustic signals, visible images and other types of information. Recently, however, even higher densification of the magnetic recording media is much in request and, accordingly, further improvement in performance of said cobalt-containing magnetic iron oxide powder has been desired.

The magnetic iron oxides used as core particles to be coated with a cobalt-containing compound have been generally produced by a wet synthetic process, and in such production process, it has been usual to add a phosphorus compound at the time of formation of acicular hydrous iron oxide or before the heat treatment (dehydration or reduction) to prevent the deformation of particle shape or sintering and coarsening of the particles due to the heat treatment, thereby providing the product with high acicularity.

In the course of studies for further improvement of performance of said cobalt-containing magnetic iron oxides, the present inventors have found that (1) the improvement of the magnetic characteristics by coating with a cobalt-containing compound depends greatly on the properties of the core material (particles) to be coated with said compound and (2) especially in case of using a phosphorus-containing magnetic iron oxide as core material, it is hard to bring out the desired magnetic characteristics such as high coercivity to a satisfactory degree by said coating or such magnetic characteristics, if brought out, would vary widely from one product to another, and further the magnetic recording medium produced from such material tends to prove poor in thermal stability. Further studies on these points in particular have led the present inventors to the finding that all of the said problems can be solved when using as core material a phosphorus-containing magnetic iron oxide treated in an aqueous alkaline medium under pressure and coating the thus treated core material with a cobalt-containing compound, and this invention was completed on the basis of such finding.

SUMMARY OF THE INVENTION

An object of this invention is to provide a process for producing a cobalt-containing magnetic iron oxide powder having excellent magnetic characteristics such as high coercivity.

A further object of this invention is to provide a process for producing a cobalt-containing magnetic iron oxide powder, which process is characterized in that the phosphorus-containing magnetic iron oxide powder if first treated in an aqueous alkaline medium under pressure at a temperature of 10° to 200° C. and then coated with a cobalt compound or a cobalt compound and other metallic compound(s).

BRIEF DESCRIPTION OF THE DRAWINGS

FIG. 1 is an electron microphotograph of the crystals of the sample I obtained in Example 7.

FIG. 2 is an electron microphotograph of the crystals of the sample L obtained in Comparative Example 3.

DETAILED DESCRIPTION OF PREFERRED EMBODIMENTS

As the magnetic iron oxide powder that serves as a core material in the process of this invention, there may be used, for example $\gamma$-$Fe_2O_3$, $Fe_3O_4$ and Berthollide iron oxides ($FeO_x$ wherein $1.33 < x < 1.50$). In preparation of these magnetic iron oxides, usually phosphorus is introduced into a mother liquor in the course of production of an acicular hydroxy iron oxide ($\alpha, \beta, \gamma$-FeOOH) which is a precursor of said magnetic iron oxides, or phosphorus is incorporated in the acicular hydroxy iron oxide or its thermally dehydrated version $\alpha$-$Fe_2O_3$, so that said magnetic iron oxides would contain phosphorus in an amount of usually 0.1 to 1% by weight based on the weight of the iron oxide.

In the process of this invention, such phosphorus-containing magnetic iron oxide powder is treated with an aqueous alkaline medium. It is usually advantageous to perform this treatment in a sealed vessel such as an autoclave under saturated water vapor pressure at a liquid temperature, and if necessary, the vessel may be filled with an inert gas or air to maintain the vessel at a predetermined pressure. The aqueous alkaline medium used in the process of this invention may be suitably selected from those aqueous media prepared by dissolving a hydroxide, a carbonate, an ammonium compound, etc., of an alkali metal or alkaline earth metal, more specifically such alkali compound as sodium hydroxide, potassium hydroxide, calcium hydroxide, sodium carbonate, potassium carbonate, etc., in a solvent such as water, aqueous alcohol, aqueous acetone or the like. In this treatment with an aqueous alkaline medium, the alkali concentration of such aqueous medium containing the magnetic iron oxide powder is usually within the range of 0.005 to 3 mol/l, preferably 0.01 to 2 mol/l. Any alkali concentration of the aqueous medium being higher than the above-mentioned range might cause partial dissolution of said iron oxide powder while an alkali concentration being lower than said range may make it unable to obtain the desired effect of the medium in this invention. The treating temperature is usually within the range of 10° to 200° C., preferably 50° to 180° C. most preferably 80° to 150° C. A temperature lower than the above mentioned range proves incapable of effectuating sufficient activation of the particle surfaces of the powder, while a temperature higher than said range may cause partial dissolution of said powder or may give rise to the problems relating to the structural material of the apparatus. The treating system needs to be kept under pressure which is usually within the range of 1.01 to 20 kg/cm², preferably 1.1 to 11 kg/cm², most preferably 1.4 to 6 kg/cm². Any pressure higher than the above-mentioned range non-preferably arises problems in use of the apparatus. The treating time is usually 0.5 to 10 hours.

It is possible to further enhance treating efficiency or to improve magnetic characteristics, particularly coercivity, by performing a treatment with an aqueous acidic medium before and/or after the above-mentioned treatment with an aqueous alkaline medium. Such treatment may be accomplished by using a dilute aqueous medium comprising any suitable substance selected from various kinds of inorganic or organic acids and salts thereof. Examples of the inorganic salts usable for this treatment are hydrochloric acid, sulfuric acid, hydrofluoric acid, nitric acid and the like, and the salts thereof usable for the treatment are, for example, ferrous chloride, aluminum sulfate and the like. As for the organic acids, one may use formic acid, acetic acid, oxalic acid, citric acid and the like. In this treatment with an aqueous acidic medium, the acid concentration of such aqueous medium containing the magnetic iron oxide powder is usually within the range of 0.01 to 1 mol/l, preferably 0.02 to 0.6 mol/l. The temperature for the treatment may be suitably selected in association with the acid concentration, but it is usually within the range of 10° to 100° C., preferably 20° to 80° C.

According to the process of this invention, the magnetic iron oxide which has undergone said treatment or treatments with an aqueous medium or media such as mentioned above and which usually has been further subjected to filtration and washing with water is then coated with a cobalt compound or with a cobalt compound and other metallic compound. The cobalt compounds usable for this purpose may include inorganic acid salts or organic acid salts of cobalt such as cobalt sulfate, cobalt chloride and cobalt acetate. As other metallic compound used with such cobalt compound, there may be listed ferrous, manganese, zinc, chromium and nickel compounds, specifically, ferrous sulfate, ferrous chloride, manganous sulfate, manganous chloride, nickelous chloride and zinc chloride.

Coating of said compound or compounds in the process of this invention may be accomplished in various ways such as mentioned below: (1) The magnetic iron oxide is dispersed in an aqueous solution of a metallic salt of the coating compound (hereinafter referred to as a metallic salt solution) and an alkaline solution is added thereto. (2) The magnetic iron oxide is dispersed in the mixture of a metallic salt solution and an alkaline solution. (3) The magnetic iron oxide is dispersed in water, and a metallic salt solution and an alkaline solution are added thereto. (4) The magnetic iron oxide is dispersed in a metallic salt solution and this dispersion is added dropwise to an alkaline solution. (5) The magnetic iron oxide is dispersed in an alkaline solution and a metallic salt solution is added thereto. In this treatment, it is possible to coat both the cobalt compound and other metallic compound simultaneously or coat one of them first and then the other. Also, in this treatment, said alkaline solution is added to the dispersion in an amount equivalent or more than equivalent to the metallic salt in the dispersion to neutralize said metallic salt, and the resultant reaction product is coated on the particle surfaces of said magnetic iron oxide. It is desirable to conduct this coating treatment usually at a temperature below the boiling point and in a non-oxidative atmosphere. The treating time is usually about 0.1 to 10 hours.

As for the quantity of said metallic compound(s), coated in case of using a cobalt compound alone, it is desirable to coat said compound in an amount of 0.5 to 10% by weight as calculated in terms of Co based on the total amount of Fe in the iron oxide, and in case of coating a cobalt compound and a ferrous compound in combination, the former is preferably coated in an amount of 0.5 to 10% by weight as calculated in terms of Co and the latter in an amount of 1 to 20% by weight as calculated in terms of $Fe^{2+}$. Combined use of a cobalt compound and a ferrous compound leads to further improvement of the treating effect obtained by said aqueous alkaline medium.

The slurry of the magnetic iron oxide, which has undergone said coating treatment may be subjected to further heat treatment, if necessary. This further heat treatment may be accomplished by various methods such as mentioned below: (1) Said slurry is subjected to a hydrothermal treatment in an autoclave at a temperature of 100° to 250° C. (2) Said slurry is filtered and washed with water and the obtained wet cakes are again dispersed in water to form a slurry, which is then subjected to a hydrothermal treatment in an autoclave at 100° to 250° C. (3) The wet cakes in the above-mentioned method (2) are heated in the presence of water vapor at 60° to 250° C. (4) The wet cakes in said method (2) are dried and then heated to 100° to 300° C. These methods may be employed either independently or in combination. This heat treatment is preferably carried out in a non-oxidative atmosphere. When the heat treatment is conducted in the presence of water vapor as in the method (3), the treating effect obtained by said aqueous alkaline medium is further enhanced. In this invention, the "heat treatment in the presence of water vapor" means a treatment for heating the wet cake in the presence of water vapor in a sealed vessel such as an autoclave or in a tube furnace filled with nitrogen gas, a treatment which comprises drying the wet cake at a low temperature and then heating it in contact with hot water vapor in a fluidized bed, and the like. Said treatment may be carried out together with pulverization by means of a high-speed fluid energy mill or the like. Among these treatments, a treatment which comprises heating the wet cake under the saturated water vapor pressure in a sealed vessel filled with nitrogen gas is most preferable.

The cobalt-containing magnetic iron oxide powder obtained according to the process of this invention, as is apparent from the Examples given below, has high coercive force and excellent thermal properties such as thermal stability, so that the magnetic recording media produced by using such magnetic iron oxide powder are also excellent in coercive force, squareness, orientability, maximum induction, etc. Although the mechanism that brings about these improvements into the process of this invention is not clear, it is supposed that the particle surfaces of the magnetic iron oxide powder uncoated with a cobalt-containing compound are activated by the treatment with an aqueous alkaline medium to facilitate even more uniform and intensive coating of the cobalt-containing compound, thereby improving the magnetic properties.

EXAMPLE 1

An aqueous NaOH solution containing a predetermined amount of pyrophosphoric acid (0.2% by weight as calculated in terms of P based on the α-FeOOH seed crystals precipitated) was added to an aqueous ferrous sulfate solution and allowed to undergo air oxidation to obtain the seed crystals of α-FeOOH, and then an aqueous NaOH solution containing a predetermined amount of orthophosphoric acid (0.2% by weight as calculated in terms of P based on the α-FeOOH precipitated) was added gradually thereto and reacted under air oxidation to let the seed crystals grow twice greater than the original size.

The reaction dispersion was filtered, the thus obtained crystals washed with water, and a predetermined amount of orthophosphoric acid (0.35% by weight as calculated in terms of P based on α-FeOOH) coated on α-FeOOH. The resulting product was, in a usual way, dehydrated in air at 650° C., reduced in steam-containing hydrogen at 420° C. and again oxidized in air at 280° C. to obtain γ-Fe$_2$O$_3$ having a coercivity (Hc) of 410 Oe, an axial ratio (L/W) of 9, a major axis length of 0.4 to 0.5μ and a P content (calculated in terms of P based on γ-Fe$_2$O$_3$) of 0.73% by weight.

The thus obtained γ-Fe$_2$O$_3$ was suspended in an aqueous 0.5 mol/l solution of NaOH to form a slurry containing 100 g/l of γ-Fe$_2$O$_3$ and this slurry was put into an autoclave and treated at 110° C. for 2 hours under pressure of 2.4 kg/cm$^2$, followed by filtration and washing with water to obtain treated γ-Fe$_2$O$_3$. The P content (calculated in terms of P based on γ-Fe$_2$O$_3$) of this product was 0.44% by weight and the powder yield was 100%.

100 g of the thus obtained treated γ-Fe$_2$O$_3$ was dispersed into 1 liter of water to form a slurry, and to this slurry were added 70 ml of an aqueous 0.85 mol/l solution of cobalt sulfate and 125 ml of an aqueous 1 mol/l solution of ferrous sulfate while blowing N$_2$ gas into the solution, followed by further addition of 175 ml of an aqueous 10 mol/l solution of NaOH under stirring, and the mixture was further stirred at room temperature (30° C.) for 5 hours. The resulting slurry was filtered and washed with water and the obtained wet cakes were put into an autoclave together with water kept in a container. After replacing the autoclave atmosphere with N$_2$ gas, said autoclave was sealed and the material therein was subjected to a heat treatment in the presence of water vapor at 130° C. for 6 hours. After this treatment, the material was dried in the atmospheric air at 60° C. for 15 hours to obtain a cobalt-containing magnetic iron oxide powder (A).

EXAMPLE 2

The procedure of Example 1 was repeated, except that the treatment in an autoclave with an aqueous alkaline medium was replaced by a treatment in an aqueous 1.0 mol/l solution of NaOH at 80° C. for 3 hours while maintaining the pressure at 4.8 kg/cm$^2$ by charging N$_2$ gas into the autoclave to obtain a cobalt-containing magnetic iron oxide powder (B).

EXAMPLE 3

The process of Example 1 was repeated, except that the treatment in an autoclave with an aqueous alkaline medium was conducted by using an aqueous 1.0 mol/l solution of NaOH at 50° C. for 3 hours while maintaining the pressure at 5.5 kg/cm$^2$ by introducing N$_2$ gas into the autoclave to obtain a cobalt-containing magnetic iron oxide powder (C).

EXAMPLE 4

The process of Example 1 was carried out by changing the treatment of Example 1 in an autoclave with an aqueous alkaline medium to a treatment with an aqueous 1.0 mol/l solution of NaOH at 30° C. for 3 hours while maintaining the pressure at 4.0 kg/cm$^2$ by charging N$_2$ gas into the autoclave to obtain a cobalt-containing magnetic iron oxide powder (D).

EXAMPLE 5

The process of Example 1 was repeated, except that the treatment in an autoclave with an aqueous alkaline medium was conducted with an aqueous 1.0 mol/l solution of NaOH at 120° C. for one hour under pressure of 3 kg/cm$^2$ to obtain a cobalt-containing magnetic iron oxide powder (E).

EXAMPLE 6

The process of Example 1 was repeated, except that before the treatment in an autoclave with an aqueous alkaline medium, γ-Fe$_2$O$_3$ was suspended in an aqueous 0.08 mol/l solution of sulfuric acid to form a slurry containing 100 g/l of γ-Fe$_2$O$_3$ and this slurry was subjected to an immersion treatment at 40° C. under normal pressure for 3 hours and then filtered and washed with water, thereby obtaining a cobalt-containing magnetic iron oxide powder (F).

COMPARATIVE EXAMPLE 1

The process of Example 1 was carried out without the treatment in an autoclave with an aqueous alkaline medium to obtain a cobalt-containing magnetic iron oxide powder (G).

COMPARATIVE EXAMPLE 2

The process of Example 1 was carried out by replacing the treatment in an autoclave with an aqueous alkaline medium by a treatment in an ordinary reaction vessel under normal pressure with an aqueous 1 mol/l solution of NaOH at 100° C. for 3 hours to obtain a cobalt-containing magnetic iron oxide powder (H).

The coercivity of each of the cobalt-containing magnetic iron oxide powder samples (A) to (H) obtained above was measured in an ordinary way, obtaining the results shown in Table 1.

Further, by using each of said samples (A) to (H), there were prepared blends of the following composition and each of the blends was dispersed and ground in a ball mill to produce a magnetic coating material.

| Blend | |
|---|---|
| (1) Cobalt-containing magnetic iron oxide powder | 100 parts by weight |
| (2) Soy-bean lecithin | 1 parts by weight |
| (3) Surfactant | 4 parts by weight |
| (4) Vinyl chloride-vinyl acetate copolymer resin | 15 parts by weight |
| (5) Dioctyl phthalate | 5 parts by weight |
| (6) Methyl ethyl ketone | 111 parts by weight |
| (7) Toluene | 122 parts by weight |

Then, each of the thus produced magnetic coating materials was coated on a polyester film, oriented and dried in a usual way to make a magnetic tape with an approximately 9μ thick magnetic coating, and the coercivity (Hc), squareness (Br/Bm), orientability (OR) and maximum induction (Bm) of each tapes were measured by an ordinary method. The results are shown in Table 1.

TABLE 1

| | Sample | γ-Fe$_2$O$_3$ powder after surface activation treatment | | Magnetic characteristics of Co-containing magnetic iron oxide powder | Tape measurements | | | |
|---|---|---|---|---|---|---|---|---|
| | | Powder yield (%) | P content* (wt. %) | Coercivity Hc (Oe) | Hc (Oe) | Br/Bm | OR | Bm (Gauss) |
| Example 1 | A | 100 | 0.44 | 693 | 716 | 0.82 | 2.0 | 1650 |
| Example 2 | B | " | 0.56 | 669 | 698 | 0.83 | 2.1 | 1580 |
| Example 3 | C | " | 0.45 | 660 | 687 | " | " | 1600 |
| Example 4 | D | " | 0.67 | 651 | 675 | " | " | 1620 |
| Example 5 | E | " | 0.38 | 690 | 702 | 0.83 | 2.1 | 1660 |
| Example 6 | F | 98 | 0.44 | 734 | 757 | " | 2.0 | 1620 |
| Comparative Example 1 | G | — | — | 582 | 604 | 0.82 | 2.1 | 1640 |
| Comparative Example 2 | H | 100 | 0.55 | 527 | 544 | " | " | 1680 |

Notes:
*P content (wt. % as calculated in terms of P based on γ-Fe$_2$O$_3$) was determined from a chemical analysis.

EXAMPLE 7

An aqueous NaOH solution containing a predetermined amount of orthophosphoric acid (0.2% by weight as calculated in terms of P based on the α-FeOOH seed crystals precipitated) was added to an aqueous ferrous sulfate solution and allowed to undergo air oxidation to form the seed crystals of α-FeOOH and then an aqueous NaOH solution was gradually added thereto and reacted under air oxidation to let the seed crystals grow about twice greater than the original size.

This reaction solution was filtered, the crystals washed with water and then a predetermined amount of orthophosphoric acid (0.3% by weight as calculated in terms of P based on α-FeOOH) was coated on the α-FeOOH crystals. The resulting product was subjected, in an ordinary way, to dehydration in air at 650° C., reduction in steam-containing hydrogen at 420° C. and re-oxidation in air at 160° C. to obtain γ-Fe$_2$O$_3$ (coercivity (Hc): 395 Oe, axial ratio (L/W): 7, major axis length: 0.4–0.5μ, P content calculated in terms of P based on γ-Fe$_2$O$_3$: 0.44% by weight).

The thus obtained γ-Fe$_2$O$_3$ was suspended in an aqueous 1 mol/l NaOH solution to form a slurry of containing 100 g/l γ-Fe$_2$O$_3$, which was treated in an autoclave under pressure of 5.8 kg/cm$^2$ at 150° C. for 3 hours, and this treated slurry was filtered and washed with water to obtain treated γ-Fe$_2$O$_3$.

100 g of the thus obtained treated γ-Fe$_2$O$_3$ was suspended in 1 liter of water to form a slurry, and to this slurry was added 70 ml of an aqueous 0.85 mol/l solution of cobalt sulfate while blowing N$_2$ gas into the solution, followed by addition of 175 ml of an aqueous 10 mol/l solution of NaOH and stirring. To the resulting mixture was further added 125 ml of an aqueous 1 mol/l solution of ferrous sulfate and then stirring was conducted at room temperature (30° C.) for one hour. This slurry was put into an autoclave and, after replacement of the interior atmosphere with N$_2$ gas, subjected to a 3-hour hydrothermal treatment at 120° C. After this treatment, the slurry was filtered, washed with water and dried in the atmospheric air at 60° C. for 15 hours to obtain a cobalt-containing magnetic iron oxide powder (I).

EXAMPLE 8

The process of Example 7 was repeated, except that after the treatment in an autoclave with an aqueous alkaline medium, the treated γ-Fe$_2$O$_3$ obtained by filtering and water-washing the slurry was further suspended in an aqueous 0.2 mol/l solution of hydrofluoric acid to form a slurry containing 100 g/l of γ-Fe$_2$O$_3$ and the slurry was subjected to immersion treatment at 30° C. under normal pressure for one hour to obtain a cobalt-containing magnetic iron oxide powder (J).

EXAMPLE 9

The process of Example 7 was repeated, except that the treatment in an autoclave with an aqueous alkaline medium was conducted at a temperature of 120° C., instead of 150° C., for a period of 3 hours (under pressure of 3.0 kg/cm$^2$) to obtain a cobalt-containing magnetic iron oxide powder (K).

COMPARATIVE EXAMPLE 3

The process of Example 7 was carried out without the treatment in an autoclave with an aqueous alkaline medium to obtain a cobalt-containing magnetic iron oxide powder (L).

COMPARATIVE EXAMPLE 4

The process of Example 7 was repeated, except that the treatment in an autoclave with an aqueous alkaline medium was replaced by a treatment in an ordinary reaction vessel under normal pressure at 100° C. for 3 hours to obtain a cobalt-containing magnetic iron oxide powder (M).

Each of the cobalt-containing magnetic iron oxide powder samples (I) to (M) obtained above was subjected to measurements of coercivity in a usual way and of thermal stability in the following way, the results being shown in Table 2.

Thermal stability

This represents temperature dependency of coercivity and is calculated from the following formula:

$$\text{Thermal stability } (Tp, \%) = \frac{\text{coercivity at } 125° \text{ C.}}{\text{coercivity at room temperature}} \times 100$$

Magnetic tapes were produced from said respective samples (I) to (M) in the same way as mentioned above and coercivity (Hc), squareness (Br/Bm), orientability (OR) and maximum induction (Bm) of these tapes were determined by a usual method. The results are shown in Table 2.

TABLE 2

| | Sample | γ-Fe$_2$O$_3$ powder after surface activation treatment | | Magnetic characteristic of Co-containing magnetic iron oxide powder | | Tape measurements | | | |
|---|---|---|---|---|---|---|---|---|---|
| | | Powder yield (%) | P content* (wt. %) | Coercivity Hc (Oe) | Thermal stability Tp (%) | Hc (Oe) | Br/Bm | OR | Bm (Gauss) |
| Example 7 | I | 100 | 0.19 | 677 | 73 | 675 | 0.82 | 1.9 | 1680 |
| Example 8 | J | " | 0.16 | 704 | " | 708 | " | " | " |
| Example 9 | K | " | 0.21 | 633 | 74 | 657 | " | 2.0 | 1670 |
| Comparative Example 3 | L | — | — | 597 | 75 | 638 | " | " | 1570 |
| Comparative Example 4 | M | 100 | 0.37 | 527 | " | 525 | 0.81 | " | 1650 |

Notes:
P* content (calculated in terms of P based on γ-Fe$_2$O$_3$) was determined from a chemical analysis.

The electron microphotographs (magnified 60,000 times) of said samples (I) and (L) are presented herein as FIGS. 1 and 2. It will be seen from these microphotographs that in the product of this invention (sample I) both cobalt and ferrous compounds are more uniformly and more smoothly coated than in the comparative product (sample L).

EXAMPLE 10

The process of Example 7 was repeated by using γ-Fe$_2$O$_3$ (coercivity (Hc): 389 Oe, axial ratio (L/W): 7, major axis length: 0.3–0.4μ, P content as calculated in terms of P based on γ-Fe$_2$O$_3$:0.52% by weight) produced in the same way as Example 7, except for the increased amount of orthophosphoric acid added, to obtain a cobalt-containing magnetic iron oxide powder (N).

COMPARATIVE EXAMPLE 5

The process of Example 10 was carried out without the treatment in an autoclave with an aqueous alkaline medium to obtain a cobalt-containing magnetic iron oxide powder (O).

COMPARATIVE EXAMPLE 6

The process of Example 10 was repeated, except that the treatment in an autoclave with an aqueous alkaline medium was replaced by a treatment in an ordinary reaction vessel under normal pressure at 100° C. for 3 hours to obtain a cobalt-containing magnetic iron oxide powder (P).

Each of said magnetic iron oxide powder samples (N) to (P) was subjected to the determination of coercivity in a usual way and of thermal stability by the above-mentioned method, obtaining the results shown in Table 3.

Also, magnetic tapes were produced from said respective samples in the same way as described above, and the coercivity (Hc), squareness (Br/Bm), orientability (OR) and maximum induction (Bm) of these tapes were measured by an ordinary method. The results are shown in Table 3.

TABLE 3

| | Sample | γ-Fe$_2$O$_3$ powder after surface activation treatment | | Magnetic characteristics of Co-containing magnetic iron oxide powder | | Tape measurements | | | |
|---|---|---|---|---|---|---|---|---|---|
| | | Powder yield (%) | P content* (wt. %) | Coercivity Hc (Oe) | Thermal stability Tp (%) | Hc (Oe) | Br/Bm | OR | Bm (Gauss) |
| Example 10 | N | 100 | 0.18 | 738 | 72 | 732 | 0.80 | 1.8 | 1840 |
| Comparative Example 5 | O | — | — | 677 | 72 | 657 | 0.82 | " | 1610 |
| Comparative Example 6 | P | 100 | 0.32 | 635 | 73 | 614 | 0.81 | 1.9 | 1640 |

Notes:
*P content (wt. % as calculated in terms of P based on γ-Fe$_2$O$_3$) was determined from a chemical analysis.

COMPARATIVE EXAMPLE 7

An aqueous solution of NaOH was added to an aqueous solution of ferrous sulfate and subjected to air oxidation to form the seed crystals of α-FeOOH, and then an aqueous solution of NaOH was added gradually thereto and reacted under air oxidation to let the nuclear crystals grow four times the original size.

This reaction solution was filtered, and the resulting solids were washed with water to obtain α-FeOOH, which was then dehydrated in air at 450° C., reduced in steam-containing hydrogen at 350° C. and again oxidized in air at 300° C., all in ordinary ways, to obtain γ-Fe$_2$O$_3$ (coercivity (Hc): 350 Oe), axial ratio (L/W): 10, major axis length: 0.4–0.5μ).

The thus obtained γ-Fe$_2$O$_3$ was suspended in an aqueous 1 mol/l solution of NaOH to form a slurry containing 100 g/l of γ-Fe$_2$O$_3$ and this slurry was treated in an autoclave under pressure of 2.4 kg/cm$^2$ at 120° C. for 3 hours and then filtered and washed with water to obtain treated γ-Fe$_2$O$_3$ at a yield of 100%.

100 g of the thus obtained treated γ-Fe$_2$O$_3$ was suspended in 1 liter of water to form a slurry, and to this slurry were added an aqueous 70 ml of a 0.85 mol/l solution of cobalt sulfate and 125 ml of an aqueous 1 mol/l solution of ferrous sulfate while blowing N$_2$ gas into the solution, followed by further addition of 175 ml of an aqueous 10 mol/l solution of NaOH under stirring, and this stirring was continued at room temperature (30° C.) for 5 hours. This slurry was then filtered and washed with water and the resulting wet cakes were put into an autoclave together with water kept in a container. After replacing the inside atmosphere of the autoclave with $N_2$ gas and then sealing the autoclave, the material therein was subjected to a heat treatment in the presence of water vapor at 130° C. for 6 hours and then dried in the atmospheric air at 60° C. for 15 hours to obtain a cobalt-containing magnetic iron oxide powder (Q).

The above-described process of Comparative Example 7 was repeated without the treatment in an autoclave with an aqueous alkaline medium to obtain a cobalt-containing magnetic iron oxide powder (R).

Said samples (Q) and (R) showed coercivity, as measured in a usual way, of 573 Oe and 578 Oe, respectively. These results indicate that the effect of this invention can not be obtained by treatign a phosphorus-non-containing magnetic iron oxide powder with an alkaline medium.

COMPARATIVE EXAMPLE 8

100 g of treated $\gamma$-$Fe_2O_3$ obtained after the manner of Comparative Example 7 using an aqueous 1 mol/l solution of NaOH was suspended in 1 liter of water, and while blowing $N_2$ gas into the solution, 70 ml of an aqueous 0.85 mol/l solution of cobalt sulfate and then 175 ml of an aqueous 10 mol/l solution of NaOH were added to the slurry under stirring, followed by further addition of 125 ml of an aqueous 1 mol/l solution of ferrous sulfate and stirring at room temperature (30° C.) for one hour. This slurry was put into an autoclave and, after replacement of the internal atmosphere with $N_2$ gas, subjected to a hydrothermal treatment at 120° C. for 3 hours. After this treatment, the slurry was filtered, washed with water and dried in the atmospheric air at 60° C. for 15 hours to obtain a cobalt-containing magnetic iron oxide powder (S).

The above-mentioned process was repeated without the treatment in an autoclave with an aqueous alkaline medium to obtain a cobalt-containing magnetic iron oxide powder (T).

Measurement of coercivity, in a usual way, of said samples (S) and (T) gave the values of 630 Oe and 633 Oe, respectively. The results show that the effect of this invention can not be obtained from treating a phosphorus-non-containing magnetic iron oxide with an aqueous alkaline medium.

What is claimed is:

1. A process for producing a cobalt-containing magnetic iron oxide powder, which comprises treating a magnetic iron oxide powder containing 0.1 to 1% phosphorus in an aqueous alkaline medium under pressure of 1.1 to 20 kg/$cm^2$ at a temperature of 10° to 200° C. and then coating the thus treated powder particles with a cobalt compound or a cobalt compound together with another metallic compound which is a ferrous, manganese, zinc, chromium or nickel compound, said cobalt containing magnetic iron oxide powder exhibiting a higher Hc than the cobalt containing magnetic iron oxide prepared as above absent said pressure treatment in the aqueous alkaline medium.

2. The process according to claim 1, wherein the treatment in the aqueous alkaline medium is carried out at a temperature of 50° to 180° C.

3. The process according to claim 1, wherein the treatment in the aqueous alkaline medium is carried out at a temperature of 80° to 150° C.

4. The process according to claim 1, wherein the treatment in the aqueous alkaline medium is carried out at a temperature of 105° to 200° C.

5. The process according to claim 1, wherein the treatment in the aqueous alkaline medium is carried out at a temperature of 110° to 150° C.

6. The process according to claim 1, wherein the treatment in the aqueous alkaline medium is carried out under pressure of 1.1 to 11 kg/$cm^2$.

7. The process according to claim 1, wherein the treatment in the aqueous alkaline medium is carried out under pressure of 1.4 to 6 kg/$cm^2$.

8. The process according to claim 1, wherein the alkali concentration of the aqueous alkaline medium containing the magnetic iron oxide powder is 0.005 to 3 mol/l.

9. The process according to claim 1, wherein the alkali concentration of the aqueous alkaline medium containing the magnetic iron oxide powder is 0.01 to 2 mol/l.

10. A process for producing a cobalt-containing magnetic iron oxide powder according to claim 1 which further comprises treating the magnetic iron oxide powder containing 0.1 to 1% phosphorus in an aqueous acidic medium before and/or after the pressure treatment of said powder in the aqueous alkaline medium in order to effect an increase in the Hc of the cobalt containing magnetic iron oxide.

11. The process according to claim 10, wherein the phosphorus-containing magnetic iron oxide powder is first treated in an aqueous acidic medium and then treated in the aqueous alkaline medium.

12. The process according to claim 10, wherein the phosphorus-containing magnetic iron oxide powder is first treated in the aqueous alkaline medium and then treated in the aqueous acidic medium.

13. The process according to claim 1, wherein the magnetic iron oxide particle surfaces are coated with a cobalt compound and a ferrous compound.

14. A process for producing a cobalt-containing magnetic iron oxide powder, according to claim 1 which further comprises heating the coated powder at 60°–250° C. in the presence of water vapor.

15. A process for producing cobalt-containing magnetic iron oxide powder according to claim 14 which further comprises treating the magnetic iron oxide powder containing 0.1 to 1% phosphorus in an aqueous acidic medium before and/or after the pressure treatment of said powder in the aqueous alkaline medium inorder to effect an increase in the Hc of the cobalt containing magnetic iron oxide.

16. The process according to claim 10, wherein the magnetic iron oxide particle surfaces are coated with a cobalt compound and a ferrous compound.

17. A process according to claim 1 wherein the amount of cobalt compound is 0.5 to 10% by weight calculated in terms of Co based on the total amount of Fe in the iron oxide.

* * * * *